(12) United States Patent
Ricketts

(10) Patent No.: US 6,756,694 B2
(45) Date of Patent: Jun. 29, 2004

(54) APPARATUS FOR GENERATING POWER FROM PASSING VEHICULAR TRAFFIC

(76) Inventor: Tod Ricketts, 7221 Meriden La., El Paso, TX (US) 79912

( * ) Notice: Subject to any disclaimer, the term of this patent is extended or adjusted under 35 U.S.C. 154(b) by 0 days.

(21) Appl. No.: 10/047,596

(22) Filed: Jan. 15, 2002

(65) Prior Publication Data
US 2003/0132636 A1 Jul. 17, 2003

(51) Int. Cl.$^7$ ............................................. H02K 35/00
(52) U.S. Cl. ....................................... 290/1 R; 290/45
(58) Field of Search .................................. 290/1 R, 1 A, 290/1 E, 54; 60/45, 398; 310/12, 13

(56) References Cited

U.S. PATENT DOCUMENTS

| | | |
|---|---|---|
| 2,020,361 A | 11/1935 | Johnston |
| 3,885,163 A | 5/1975 | Toberman |
| 4,032,829 A | 6/1977 | Schenavar |
| 4,081,224 A | 3/1978 | Krupp |
| 4,173,431 A | 11/1979 | Smith .......................... 417/229 |
| 4,212,598 A | 7/1980 | Roche et al. |
| 4,239,975 A | 12/1980 | Chiappetti |
| 4,250,395 A | 2/1981 | Lundgren |
| 4,339,920 A | 7/1982 | Le Van |
| 4,405,872 A | 9/1983 | Thomas |
| 4,409,489 A | 10/1983 | Hayes |
| 4,418,542 A | 12/1983 | Ferrell |
| 4,614,875 A | 9/1986 | McGee |
| 4,700,540 A | * 10/1987 | Byrum ........................ 60/325 |
| 4,739,179 A | 4/1988 | Stites |
| 4,843,250 A | 6/1989 | Stupakis ...................... 290/53 |
| 4,980,572 A | 12/1990 | Sen ............................ 290/1 R |
| 5,157,922 A | 10/1992 | Baruch |
| 5,272,378 A | 12/1993 | Wither |
| 5,355,674 A | 10/1994 | Rosenberg ................... 60/325 |
| 5,634,774 A | 6/1997 | Angel et al. |
| 6,091,159 A | * 7/2000 | Galich ........................ 290/1 R |
| 6,172,426 B1 | 1/2001 | Galich |
| 6,376,925 B1 * | 4/2002 | Galich ........................ 290/1 R |

* cited by examiner

Primary Examiner—Nicholas Ponomarenko
(74) Attorney, Agent, or Firm—Dorsey & Whitney LLP (57) ABSTRACT

An apparatus for generating power from vehicular traffic is disclosed. The apparatus includes a plurality of cylinders, each of which has a piston slidably mounted therein and a fluid cavity beneath the piston. Each of the pistons has an upper face which is extendable above a road surface so as to be engageable by passing vehicles. When a passing vehicle engages a piston, the weight of the vehicle pushes the piston downwardly and causes fluid to flow from the respective fluid cavity toward a turbine or other power conversion means. The flow causes the turbine to rotate, thereby producing useable energy.

24 Claims, 6 Drawing Sheets

Fig. 7

APPARATUS FOR GENERATING POWER FROM PASSING VEHICULAR TRAFFIC

BACKGROUND OF THE INVENTION

1. Field of the Invention

The present invention comprises an apparatus for placement on a roadway to generate power from the weight of passing vehicular traffic.

2. Description of the Related Art

Ever increasing demand for electric power requires that new sources of energy be located and utilized. One untapped resource exists in the form of potential energy stored by the millions of vehicles which travel the world's highways every day. Each moving vehicle has a weight which generally ranges from 2,000 pounds for a small passenger car to 80,000 pounds for a large tractor-trailer truck. If even a small percentage of the energy represented by this vast amount of moving weight could be harnessed and converted to useable form, then the resulting power output would be tremendous.

Prior attempts to harness the potential energy of moving vehicular traffic include Roche, et al., U.S. Pat. No. 4,212,598, which discloses placing a plurality of pneumatic cylinders or air bladders under respective pivoting actuating panels in a roadway or sidewalk. As vehicle or foot traffic passes over the actuating panels, air is forced out of the cylinders or bladders and circulated to a turbine which is rotated by the flow of air. The turbine is connected to a generator which produces electricity.

McGee, U.S. Pat. No. 4,614,875, discloses placing a plurality of small rotor and stator type electric generators under a roadway. Each generator is connected to a vertical spindle which is depressed when a vehicle passes thereover. The spindle has screw threads which rotate the rotor of the generator when the spindle is depressed, thereby generating electricity.

Galich, U.S. Pat. No. 6,172,426, discloses an energy producing platform having a fluid filled bladder positioned therebeneath such that the fluid is compressed by vehicles passing over the platform and forced out of the bladder. The fluid flowing from the bladder is circulated to an accumulator which releases the fluid when a preset pressure is reached. When released from the accumulator, the fluid flows to a generator where the flow is used to produce electricity. In an alternative embodiment of the invention, a moveably mounted platform has a lever arm connected to it such that downward movement of the platform caused by a vehicle passing thereover causes the lever arm to pivot. A hydraulic cylinder is connected to an outboard end of the lever arm such that fluid is forced from the cylinder upon actuation of the lever arm. Again, the fluid is channeled through an accumulator to a generator to produce electricity.

SUMMARY OF THE INVENTION

The present invention comprises an apparatus for generating power from vehicular traffic. The apparatus includes a plurality of cylinders, each of which has a piston slidably mounted therein and a fluid cavity beneath the piston. Each of the pistons has an upper face which is extendable above a road surface so as to be engageable by passing vehicles. When a passing vehicle engages a piston, the weight of the vehicle pushes the piston downwardly and causes fluid to flow from the respective fluid cavity toward a turbine or other power conversion means. The flow causes the turbine to rotate, thereby producing useable energy.

DETAILED DESCRIPTION OF THE PREFERRED EMBODIMENT

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof Certain terminology will be used in the following description for convenience in reference only and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Figure 1:
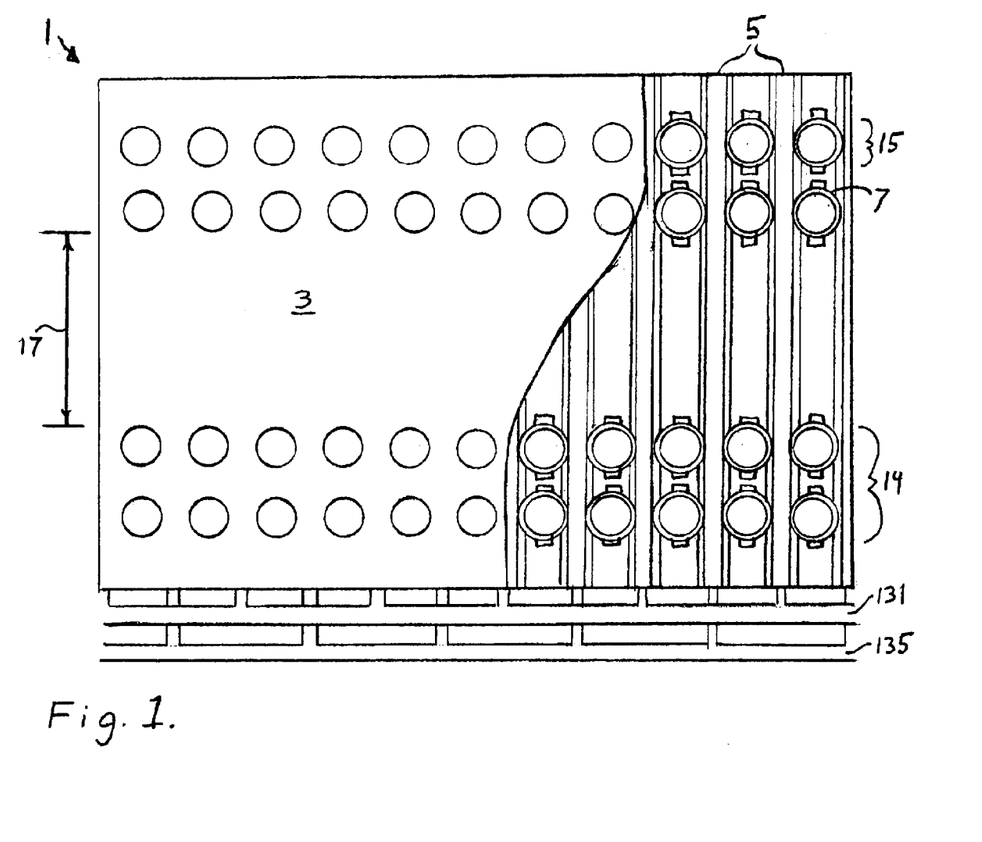
FIG. 1 is a plan view of one lane of a section of roadway incorporating a power generating apparatus according to the present invention. A portion of a mat covering the apparatus has been removed to disclose structure therebeneath.
Figure 2:
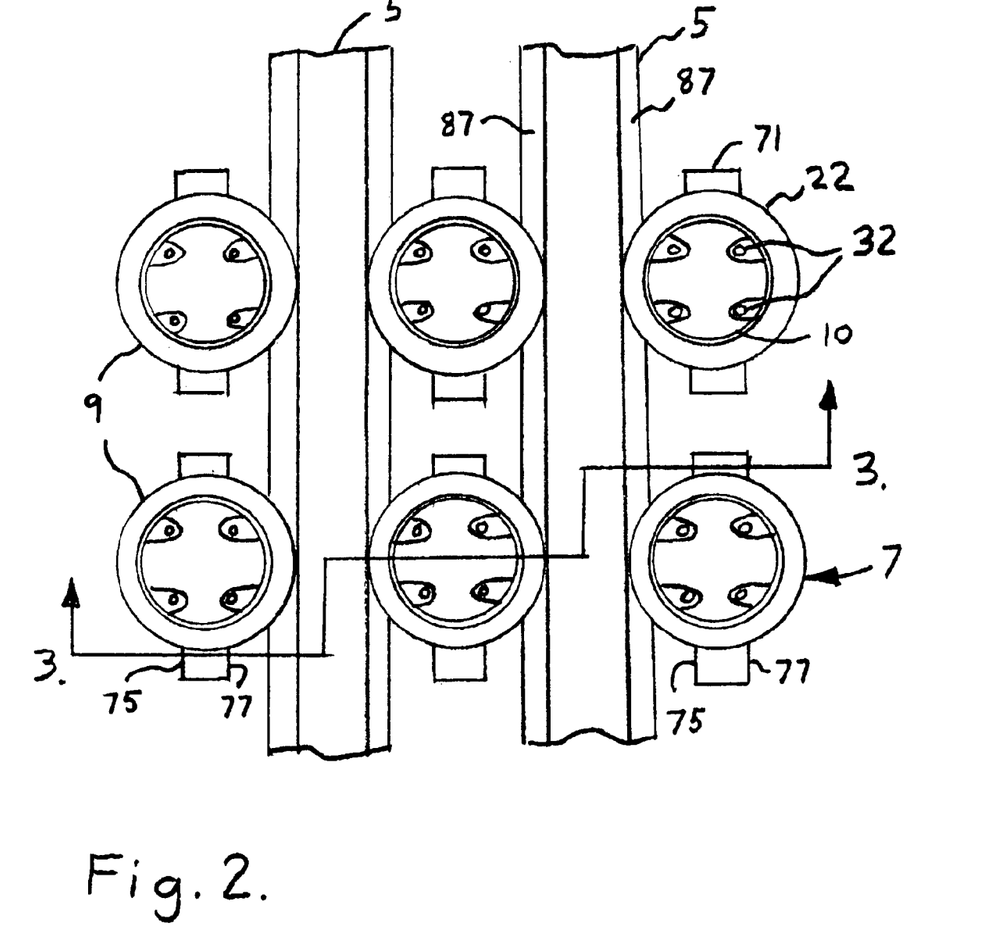
FIG. 2 is an enlarged fragmentary plan view of a portion of the apparatus of FIG. 1.
Figure 5:
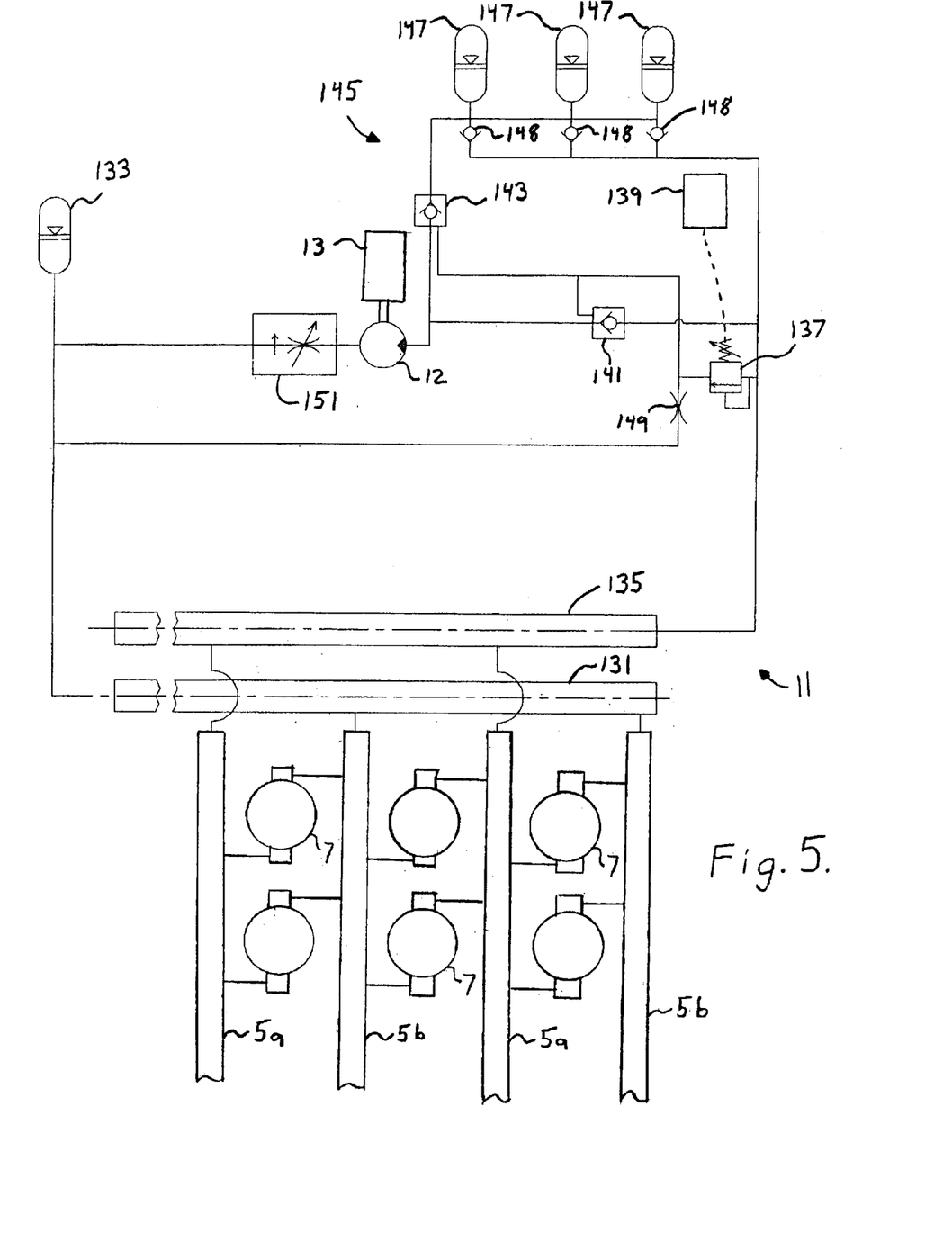
FIG. 5 is a schematic diagram showing the hydraulic circuit of the apparatus.

Referring to the drawings in more detail and in particular to FIGS. 1 and 2, the reference number 1 generally designates a power generation apparatus embodying the present invention. The apparatus 1 includes a mat 3 sized and shaped for placement on a roadway to cover at least one traffic lane thereof. Positioned beneath the mat 3 are a plurality of transverse parallel supports 5 between which are mounted a plurality of hydraulic cylinders 7. Each cylinder 7 includes a piston 9 having an upwardly convex plunger cap 10 which extends above the surface of the mat 3 so as to be engageable by the wheels of passing motor vehicles. When engaged by a vehicle, the cylinders 7 act as pumps to create pressurized flow in a hydraulic fluid. As seen in FIG. 5, the flow created by the cylinders 7 is channeled through a hydraulic circuit 11 to spin a turbine 12 which is mechanically connected to an electric generator 13.

Referring again to FIG. 1, the cylinders 7 need not cover the entire traffic lane, but can instead be concentrated into a pair of tracks 14 which are spaced apart to correspond to the wheel tracks of the majority of vehicles. Each of the tracks 14 may include several rows 15 of the cylinders 7 (two rows 15 per track 14 are shown in FIG. 1). An open space 17 is left between the tracks 14 which allows for drivers of motorcycles and other light vehicles to avoid driving over the pistons 9 of the cylinders 7 if so desired.

Figure 3:
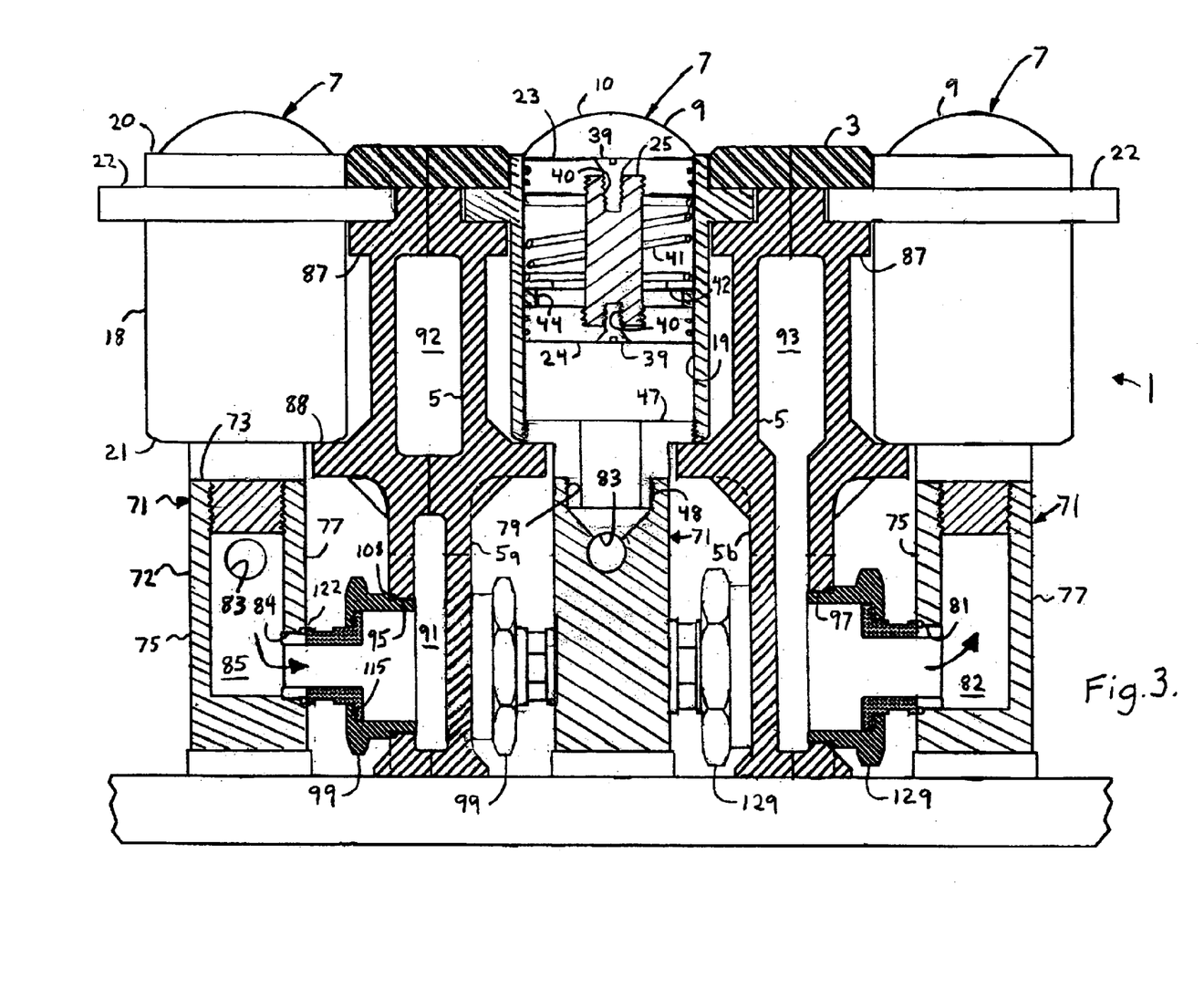
FIG. 3 is a cross-sectional view of the apparatus taken generally along line 3—3 in FIG. 2.
Figure 4:
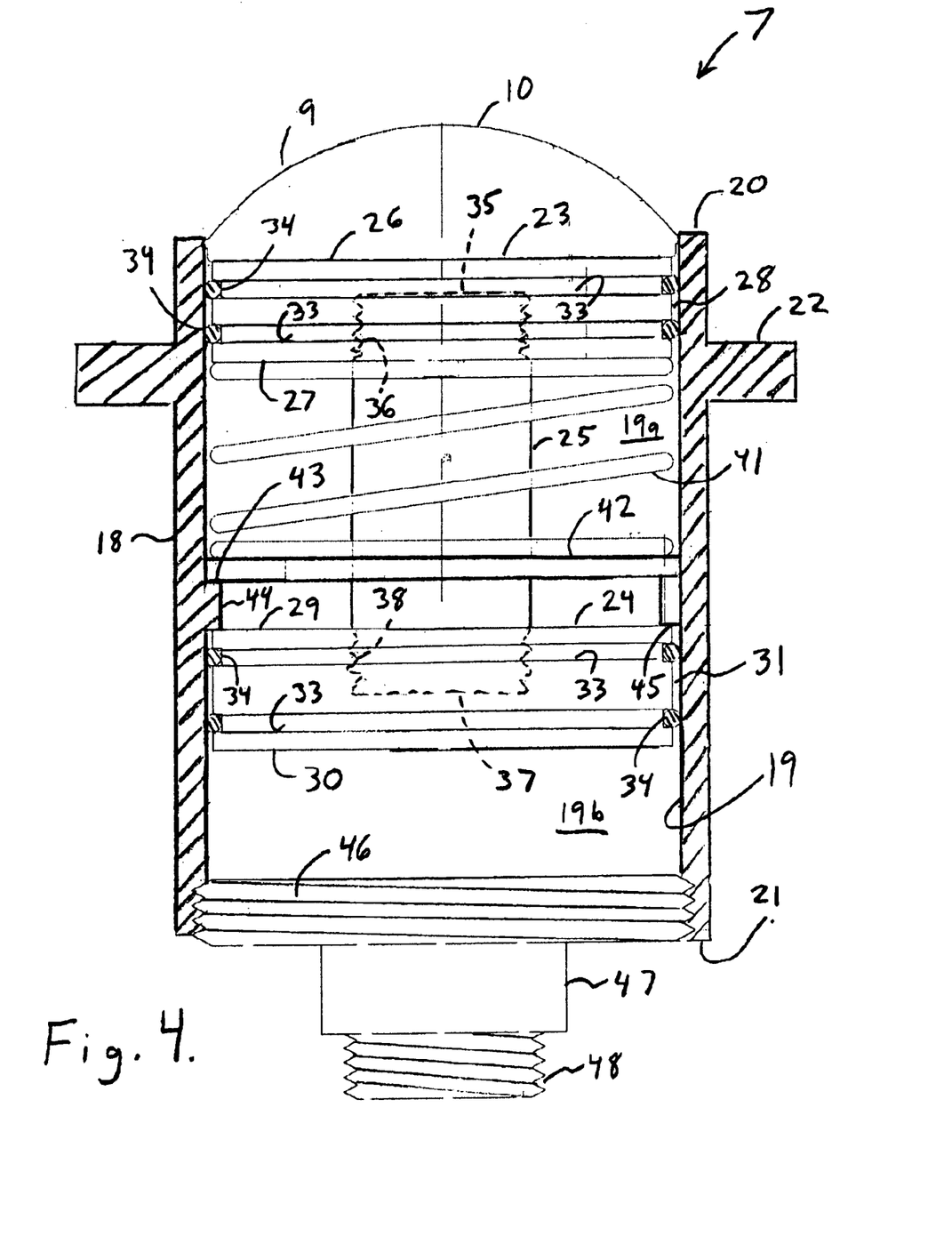
FIG. 4 is a side view of one of the cylinders of FIG. 3 with the cylinder body and O-rings shown in cross-section.

Referring to FIGS. 3 and 4, each cylinder 7 includes a tubular cylinder body 18 forming a cavity 19 in which the respective piston 9 is slidably mounted. The cylinder body 18 has an upper end 20 and a lower end 21. An annular flange 22 extends outwardly from the cylinder body 18 in a location spaced downwardly from the upper end 20 a distance which is substantially equal to the thickness of the mat 3.

Each piston 9 includes an upper piston section 23 and a lower piston section 24 connected by an intermediate rod 25 such that the piston sections 23 and 24 move in tandem. The upper section 23 has an upper face 26, a lower face 27 and an outer edge 28. Similarly, the lower section 24 has an upper face 29, a lower face 30 and an outer edge 31. The plunger cap 10 of each cylinder 7 is connected to the upper face 26 of the respective upper piston section 23 by fasteners such as allen head machine screws 32. Annular grooves 33 formed on the respective outer edges 28 and 31 of the piston sections 23 and 24 receive respective sealing rings 34 which seal the gaps between the outer edges 28 and 31 and the cylinder body 18.

The intermediate rod 25 has an upper threaded end 35 which is received by a threaded axial receiver 36 formed in the lower face 27 of the upper piston section 23 and a lower threaded end 37 which is received by a threaded axial receiver 38 formed in the upper face 29 of the lower piston section 24. The intermediate rod 25 is further secured to each of the piston sections 23 and 24 by a respective flat head machine screw 39 which passes through the respective piston section 23 or 25 and engages a respective threaded receiver 40 in the rod 25.

The portion of the cylinder cavity 19 located between the upper piston section 23 and the lower piston section 24 comprises a dry cavity 19a which does not receive hydraulic fluid. The portion of the cavity 19 located below the lower piston section 24 comprises a fluid cavity 19b which is filled with hydraulic fluid during normal operation of the apparatus 1.

The piston 9 is biased upwardly by a compression spring 41 which is positioned within the dry cavity 19a. An upper end of the spring 41 bears against the lower face 27 of the upper piston section 23. A lower end of the spring 41 bears against a spacer 42 which in turn bears against an upper surface 43 of a shoulder 44 formed on the body 18, the shoulder 44 extending inwardly into the cylinder cavity 19. The shoulder 44 further includes a lower surface 45 which serves as a stop to limit upward movement of the piston 9. The lower surface 45 is engaged by the upper face 29 of the lower piston section 24 when the piston 9 is at the top of its stroke.

The positioning of the spring 41 above the lower piston section 24 allows the spring 41 to be serviced from the top of the apparatus 1 without opening the fluid cavity 19b. To access the spring 41, the plunger cap 10 is first removed by unscrewing the screws 32. With the cap 10 removed, the upper flat head machine screw 39 may be removed. The upper piston section 23 can then be rotated off of the intermediate rod 25 and removed through the upper end 20 of the cylinder cavity 19, providing access to the spring 41. While the upper piston section 23 is out of the cavity 19, the rings 34 on the upper section 23 may also be replaced.

Because each cylinders 7 needs to be serviced at intervals which are dependent upon the number of depressions of the cylinder, a proximity switch (not shown) may be included in each of the cylinders 7 so as to be actuated upon each depression of the piston 9. The proximity switch is connected to a counter (not shown) which keeps track of the number of depressions of the piston 9. The counter can then be read to determine when the respective cylinder 7 has undergone a predetermined number of depressions, thereby indicating that the cylinder 7 needs to be serviced.

The lower end 21 of the cylinder body 18 is internally threaded to receive an externally threaded upper end 46 of a reducer 47 having an externally threaded inlet/outlet port 48 extending downwardly therefrom. The components of the cylinder 7, including the body 18, piston sections 23 and 24, and reducer 47 are preferably made of marine grade stainless steel.

Referring again to FIG. 3, positioned below each cylinder 7 is a respective check valve 71 having a generally rectangular valve body 72 which includes an upper face 73, a first side face 75, and an opposed second side face 77. The upper face 73 has an axially aligned, internally threaded cylinder port 79 formed therethrough having a diameter enabling the port 79 to retainably receive the externally threaded inlet/outlet port 48 of the respective cylinder 7. It should be noted that the single inlet/outlet design of the cylinders 7 and check valves 71 allows the cylinders 7 to be directly connected to the check valves 71 with a minimum of plumbing. In addition, the design allows the cylinders 7 to be unscrewed out of the apparatus 1 from the top side for ease of maintenance.

A supply port 81 is formed in the valve body 72 through the first side face 75. The supply port 81 communicates with a supply cavity 82 formed within the valve body 72. The supply cavity 82, in turn, communicates with the cylinder port 79 through a passage 83. The supply cavity 82 receives a supply check valve cartridge (not shown) which allows fluid to flow from the supply port 81 through the passage 83 to the cylinder port 79, but prevents flow in the opposite direction.

Similarly, a pressure port 84 is formed through the second side face 77 of the valve body 72. The pressure port 84 communicates with a pressure cavity 85 formed within the valve body 72. The pressure cavity 85 also communicates with the cylinder port 79 through the passage 83. The pressure cavity 85 receives a pressure check valve cartridge (not shown) which allows fluid to flow from the cylinder port 79 through the passage 83 to the pressure port 84, but prevents flow in the opposite direction. Should an unexpected surge in the supply pressure occur, both check valve cartridges will open, allowing fluid to flow directly from the supply port 81 to the pressure port 84 through the passage 83.

Each cylinder 7 is positioned between a pair of adjacent supports 5. Each support 5 includes an opposed pair of support flanges 87, each of which supports the annular flange 22 of the adjacent cylinder 7. Each support 5 further includes a plurality of opposed pairs of support shelves 88 longitudinally spaced along the support 5 in alignment with the locations of the cylinders 7. Each shelf 88 serves to support the lower end 21 of the cylinder body 18 of the adjacent cylinder 7. The shelves 88 are each reinforced by a gusset 89.

Alternate ones of the supports 5, indicated by the reference numeral 5a in FIG. 3, serve as pressure manifolds and include a pressure passage 91. Each pressure manifold 5a may also include a temperature control passage 92 through which heated fluid may be circulated in cold weather to warm the apparatus 1 and prevent icing of the mat 3. The fluid may be heated by power generated by the apparatus 1. In hot weather, coolant may be circulated through the temperature control passage 92 to cool the apparatus 1. The remaining supports 5, indicated by the reference numeral 5b, serve as supply manifolds and each include a supply passage 93. Each cylinder 7 with its respective check valve 71 is thus positioned between a pressure manifold 5a and a supply manifold 5b. Each check valve 71 is oriented with its supply port 81 adjacent a respective supply manifold 5b and its pressure port 84 positioned adjacent a pressure manifold 5a. Threaded receivers 95 are formed in each pressure manifold 5a in alignment with the respective pressure ports 84 and in communication with the pressure passage 91. Similarly, threaded receivers 97 are formed in each supply manifold 5b in alignment with the respective supply ports 81 and in communication with the supply passage 93.

Figure 6:
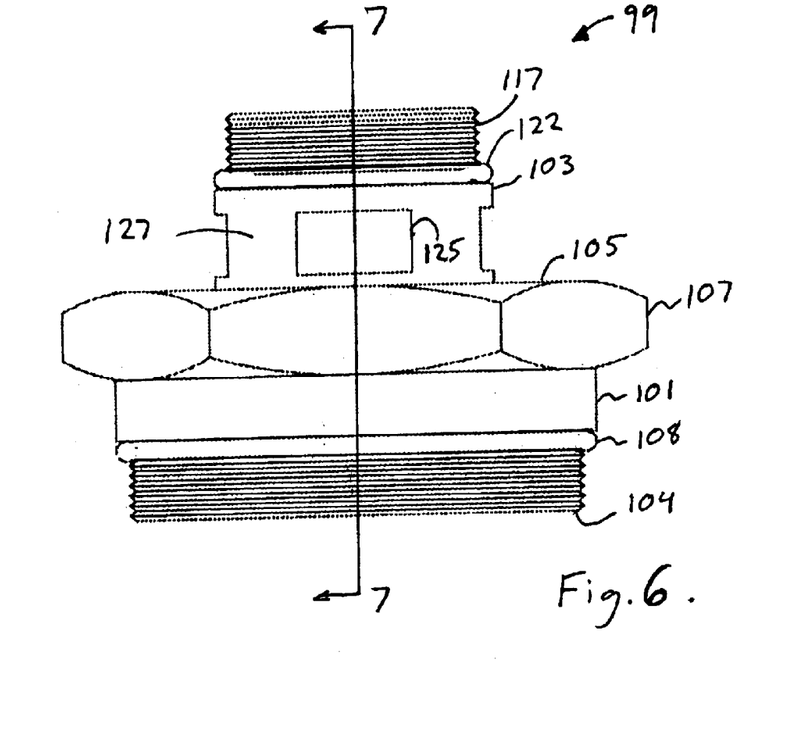
FIG. 6 is an enlarged plan view of a telescoping union fitting which is used in the apparatus.
Figure 7:
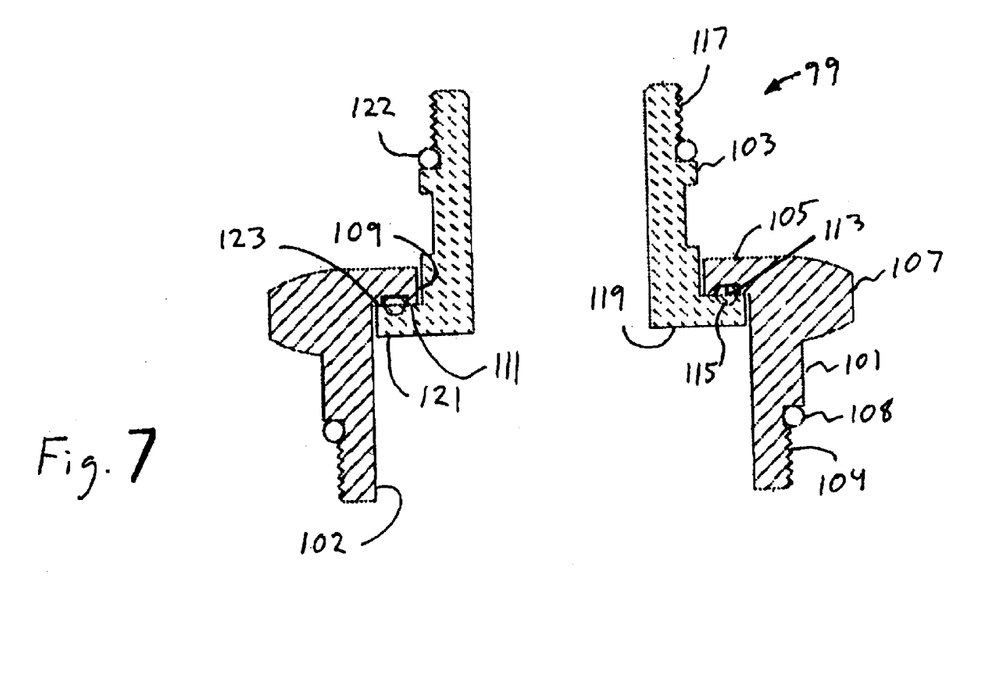
FIG. 7 is a cross-sectional view of the union fitting taken generally along line 7—7 in FIG. 6.

Each pressure port 84 is connected to the respective threaded receiver 95 by a telescoping union fitting 99. Each fitting 99, as shown in FIGS. 6 and 7, includes an outer section 101 with a central bore 102, and an inner section 103 slidably received within the bore 102. The outer section 101 has an externally threaded first end 104 sized to be retainably received by the respective threaded receiver 95, and an opposed second end 105 having a hexagonal flange 107 which allows the outer section 101 to be tightened into the receiver 95 with a wrench. An O-ring 108 is positioned proximate the first end 104 to seal against the pressure manifold 5a. The second end 105 further includes a central opening 109 sized to receive the inner section 103. An annular thrust surface 111 is formed around the opening 109 on an interior face of the second end 105. The thrust surface 111 preferably has an annular groove 113 formed therein for receiving an O-ring 115.

The inner section 103 of the fitting 99 has an externally threaded first end 117 sized to be retainably received by the respective pressure port 84, and an opposed second end 119 having an outwardly extending flange 121 sized to be received within the central bore 102 of the outer section 101. An O-ring 122 is positioned proximate the first end 117 to seal against the check valve body 72. The flange 121 includes an annular thrust surface 123 sized and shaped to bear against the thrust surface 111 of the outer section 101. A plurality of wrench flats 125 are formed on an external surface 127 of the inner section 103 such that the section 103 may be tightened into the pressure port 84 using a wrench.

When installed, the union fittings 99 are tensioned between the respective check valve 71 and the adjacent pressure manifold 5a. The first end 104 of the outer section 101 is screwed into the receiver 95 of the pressure manifold 5a until the O-ring 108 seals against the pressure manifold 5a. Similarly, the first end 117 of the inner section 103 is screwed into the pressure port 84 of the check valve 71 until the O-ring 122 seals against the valve body 72. This draws the thrust surface 111 against the mating thrust surface 123, compressing the O-ring 115 therebetween. With the union fittings 99 thus installed, the pressure ports 84 are each placed in communication with the pressure passage 91 within the adjacent pressure manifold 5a.

Each supply port 81 is connected to the respective threaded receiver 97 in the adjacent supply manifold 5b by a telescoping union fitting 129 which is substantially similar to the fitting 99 previously described, however the threaded ends of the inner and outer sections are sized to be retainably received by the supply port 81 and receiver 97, respectively. The union fittings 129 place the supply ports 81 in fluid communication with the supply passage 93 within the adjacent supply manifold 5b. The unique, telescoping design of the union fittings 99 and 129 allows the cylinders 7 to be spaced in closer proximity to one another than would be possible with standard plumbing fittings.

As a passing vehicle engages the plunger cap 10 of a cylinder 7, the piston 9 thereof is forced downwardly, building pressure in the fluid cavity 19b. When the pressure in the fluid cavity overcomes the set point of the pressure check valve cartridge, fluid flows out of the fluid cavity 19b, through the check valve 71, and into the pressure passage 91 of the adjacent pressure manifold 5a.

As the vehicle passes off of the plunger cap 10 of a cylinder 7, the piston 9 thereof is urged upwardly by the spring 41, creating a vacuum in the fluid cavity 19b. When the vacuum in the fluid cavity overcomes the set point of the supply check valve cartridge (which is set relatively low), the valve opens, allowing fluid to be drawn into the fluid cavity 19b through the check valve 71 from the supply passage 93 in the adjacent supply manifold 5b.

Referring to FIG. 5, the hydraulic circuit 11 includes a master supply manifold 131 which delivers fluid from a closed and pressurized reservoir 133 to the supply manifolds 5b along a section of roadway such that a positive pressure is maintained in the supply manifolds 5b. The pressure manifolds 5a are connected through a master pressure manifold 135 to a master pressure control valve 137 which allows for variation of the operating pressure maintained within the cylinders 7 and pressure manifolds 5a.

The amount of power which can be generated by the apparatus 1 is directly related to the operating pressure; thus, the higher the operating pressure, the more power may be produced. The operating pressure at which the apparatus 1 may be operated is, in turn, determined by the weight of the vehicles passing over the cylinders 7. For reasons of safety and comfort to the drivers of the vehicles, it is preferable that the operating pressure in the cylinders 7 be set low enough, via the master pressure control valve 137, that the pistons 9 will move downwardly under the weight of the lightest vehicles by which they are engaged. If it is desired for the operating pressure to be set at a higher level the apparatus 1 may be placed only in traffic lanes which are dedicated to heavy commercial vehicle traffic. Alternatively, the apparatus 1 may include some sections which are placed in commercial vehicle lanes and are set to operate at higher pressures, as well as other sections which are placed in passenger vehicle lanes and are set to operate at lower pressures.

The master pressure control valve 137 may be adapted to be electronically controlled, allowing the operating pressure of the respective section of the apparatus 1 to be varied almost instantaneously. In such applications, the apparatus 1 could also include a sensor 139 which could read the type of vehicle approaching and signal the master pressure control valve 137 to vary the operating pressure to match the particular vehicle. The sensor 139 may comprise a strain gauge or similar weighing mechanism mounted in the road surface, an optical sensor used to determine the size or length of the vehicle, or a receiver which could pick up an identification signal from a transmitter (not shown) mounted on the vehicle.

In addition to being dependant on the operating pressure within the cylinders 7, power output of the apparatus 1 is also directly related to the number of pistons 9 which are depressed by each vehicle as it passes over the apparatus 1. In order to multiply the number of pistons 9 which are so actuated, commercial vehicles may be equipped with retractable rollers (not shown) mounted under their trailers which could be extended to engage the pistons 9 of the cylinders 7 when the vehicle is passing over the apparatus 1. This would provide for more cylinder actuations than could be accomplished by the wheels of the vehicle alone.

The master pressure control valve 137 also provides a pilot signal which operates a bypass valve 141 and a discharge valve 143 which control flow through an accumulator circuit 145. The circuit 145 includes a bank of accumulators 147 and respective check valves 148. Fluid is provided to the master pressure control valve 137 at adequate pressure for the pilot signal through an orifice 149. When traffic is light and the flow from the cylinders 7 is therefore intermittent, the bypass valve 141 is held closed and fluid flows to the accumulators 147 where it is accumulated to a preset discharge pressure before being released to the turbine 12 through the discharge valve 143, thereby powering the electric generator 13 mechanically coupled to the turbine 12. When traffic is heavier and the flow from the cylinders 7 is relatively constant, a pressure signal is sent from the master pressure control valve 137 which opens the bypass valve 141 and holds the accumulator discharge valve 143 closed. This allows the fluid to flow directly to the turbine 12, bypassing the accumulator circuit 145, and powering the generator 13.

The turbine 12 is provided with a turbine protect valve 151 which, if necessary, vents flow to prevent the turbine from over-revving. From the turbine 12, fluid flows back to the reservoir 133 to be re-circulated to the cylinders 7.

It is to be understood that while certain forms of the present invention have been illustrated and described herein, it is not to be limited to the specific forms or arrangement of parts described and shown. For example, while the apparatus 1 has been described herein as being hydraulically actuated, it is to be understood that pneumatics could be used instead. It is also to be understood that the turbine 12 and the electric generator 13 disclosed herein are only intended to be examples of how fluid flow created by the cylinders 7 can be converted into useful energy and that other power conversion means could be used. For example the turbine 12 could be mechanically coupled to another mechanical device, such as an irrigation pump, instead of an electric generator.

Furthermore, the present invention is not to be limited to use in connection with automobile and truck traffic, but is suitable for application to any situation where moving vehicles are passing over a land surface. For example, the apparatus 1 could easily be placed between the rails of a railroad track where the pistons 9 would be engaged by rollers or other structure mounted on the underside of passing trains. For this reason, the term "vehicle" should be interpreted to mean any land vehicle, including trains, and the terms "road" and "roadway" should be interpreted to include railroad tracks and right of ways.

What is claimed and desired to be secured by Letters Patent is as follows:

1. A power generation apparatus for placement in a roadway subject to vehicles passing thereover, said apparatus comprising:
   a) a road surface;
   b) a plurality of cylinders, each of said cylinders having a piston slidably mounted therein and a fluid cavity beneath said piston, each of said pistons having an upper face extendable above said road surface so as to be engageable by passing vehicles;
   c) a fluid source connected to said cylinders and supplying fluid to said fluid cavities thereof, and
   d) power conversion means connected to said cylinders; wherein
   e) as a passing vehicle engages said pistons, the weight of the vehicle pushes said pistons downwardly and causes fluid to flow from said fluid cavity toward said conversion means which converts said flow to useable energy.

2. The apparatus as in claim 1 wherein each said cylinder includes only one fluid port, said fluid port being connected to a respective check valve, said check valve also being fluidly connected to said fluid source and to said conversion means, said check valve allowing fluid to flow from said fluid source to said cylinder and from said cylinder to said conversion means but preventing flow from said cylinder to said fluid source or from said conversion means to said cylinder.

3. The apparatus as in claim 1 wherein said cylinders are mounted between parallel cylinder supports, alternate ones of said supports being first supports having a supply passage formed therein, each said supply passage connecting respective ones of said cylinders to said fluid source, the remainder of said supports being second supports having a pressure passage formed therein, each said pressure passage connecting respective ones of said cylinders to said conversion means.

4. The apparatus as in claim 3 wherein each said cylinder includes only one fluid port, said fluid port being connected to a respective check valve, said check valve also being connected to a respective one of said supply passages and a respective one of said pressure passages, said check valve allowing fluid to flow from said supply passage to said cylinder and from said cylinder to said pressure passage but preventing flow from said cylinder to said supply passage or from said pressure passage to said cylinder.

5. The apparatus as in claim 4 wherein each said check valve is connected to said respective pressure passage by a telescoping union fitting; said fitting comprising:
   a) an outer section having a first end, a second end, and a bore extending therethrough, said first end being threadably receivable by a threaded opening in one of said second supports, said second end including an axial opening communicating with said bore and an inwardly facing annular thrust surface adjacent said opening; and
   b) an inner section slidably receivable within said bore, said inner section having a first end and a second end, said first end being sized to pass through said opening and threadably receivable by a threaded opening in said check valve, said second end including an outwardly facing annular thrust surface adjacent said axial opening; wherein
   c) as said first ends are tightened into said threaded receivers, said union fitting is placed in tension such that said inwardly facing thrust surface on said outer section seals against said outwardly facing thrust surface on said inner section.

6. The apparatus as in claim 5 wherein said union fitting further includes an annular groove formed in one of said thrust surfaces and an O-ring seal seated in said annular groove.

7. The apparatus as in claim 4 wherein each said check valve is connected to said respective supply passage by a telescoping union fitting; said fitting comprising:
   a) an outer section having a first end, a second end, and a bore extending therethrough, said first end being threadably receivable by a threaded opening in one of said first supports, said second end including an axial opening communicating with said bore and an inwardly facing annular thrust surface adjacent said opening; and b) an inner section slidably receivable within said bore, said inner section having a first end and a second end, said first end being sized to pass through said opening and threadably receivable by a threaded opening in said check valve, said second end including an outwardly facing annular thrust surface adjacent said axial opening; wherein c) as said first ends are tightened into said threaded receivers, said inwardly facing thrust surface on said outer section seals against said outwardly facing thrust surface on said inner section.

8. The apparatus as in claim 7 wherein said union fitting further includes an annular groove formed in one of said thrust surfaces and an O-ring seal seated in said annular groove.

9. The apparatus as in claim 1 wherein said piston upper faces are upwardly convex.

10. The apparatus as in claim 1 wherein said piston is biased upwardly by a spring.

11. The apparatus as in claim 10 wherein:

a) said piston includes an upper section and a lower section connected together by an intermediate rod;

b) an annular ledge extends into said cylinder from a cylinder wall thereof between said upper and lower piston sections; and c) said spring is a compression spring positioned between said upper piston section and said annular ledge.

12. The apparatus as in claim 11 wherein said upper piston section is removable from said intermediate rod through an upper end of said cylinder.

13. The apparatus as in claim 3 wherein said road surface comprises a mat supported on said cylinder supports.

14. The apparatus as in claim 3 wherein at least some of said supports further include a temperature control passage through which a temperature control fluid may be circulated.

15. The apparatus as in claim 14 wherein said temperature control fluid is a heated fluid heated by energy from said conversion means.

16. A power generation apparatus for placement in a roadway subject to vehicles passing thereover, said apparatus comprising:

a) a road surface;

b) a plurality of hydraulic cylinders, each of said cylinders having a piston slidably mounted therein and a fluid cavity beneath said piston, said pistons being extendable above said road surface so as to be engageable by passing vehicles;

c) a hydraulic fluid source connected to said cylinders and supplying hydraulic fluid to said fluid cavities thereof;

d) a pressure manifold communicating with said fluid cavities;

e) a turbine fluidly connected to said pressure manifold; and f) an electric generator operatively connected to said turbine; wherein g) as a passing vehicle engages said pistons, the weight of the vehicle pushes said pistons downwardly and causes hydraulic fluid to flow from said fluid cavity toward said turbine, said flow causing said turbine to rotate and said generator to produce electricity.

17. The power generation apparatus as in claim 16 and further including a pressure control valve fluidly connected to said pressure manifold, said control valve selectively controlling an operating pressure within said cylinders.

18. The power generation apparatus as in claim 17 wherein said operating pressure is matched to the minimum weight of vehicles passing over said cylinders.

19. The power generation apparatus as in claim 17 and further including a sensor connected to said pressure control valve, said sensor adapted to read an indication of the weight of a vehicle approaching said apparatus and communicate a signal to said pressure control valve, said pressure control valve adjusting said operating pressure in response to said signal.

20. The power generation apparatus as in claim 17 wherein said pressure control valve further controls flow through an accumulator circuit between said pressure manifold and said turbine.

21. The apparatus as in claim 16 wherein each said cylinder includes only one fluid port, said fluid port being connected to a respective check valve, said check valve also being fluidly connected to said fluid source and to said turbine, said check valve allowing fluid to flow from said fluid source to said cylinder and from said cylinder to said turbine but preventing flow from said cylinder to said fluid source or from said turbine to said cylinder.

22. The apparatus as in claim 16 wherein said piston is biased upwardly by a spring.

23. The apparatus as in claim 22 wherein:

a) said piston includes an upper section and a lower section connected together by an intermediate rod;

b) an annular ledge extends into said cylinder from a cylinder wall thereof between said upper and lower piston sections; and c) said spring is a compression spring positioned between said upper piston section and said annular ledge.

24. The apparatus as in claim 23 wherein said upper piston section is removable from said intermediate rod through an upper end of said cylinder.

* * * * *